Nov. 18, 1958  E. F. BOEGEL  2,860,661
CONTROLLABLE MIXING FAUCET
Filed March 28, 1956  2 Sheets-Sheet 1

Ernest F. Boegel
INVENTOR.

BY *Clarence A. O'Brien*
*and Harvey B. Jacobson*
Attorneys

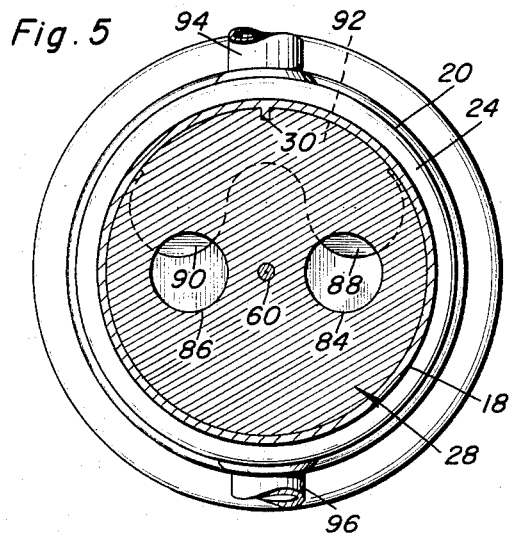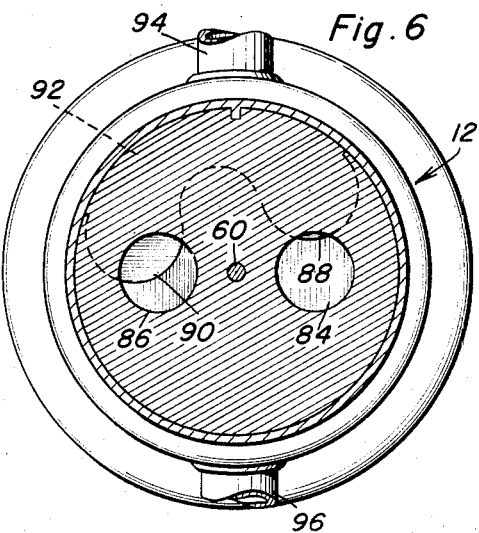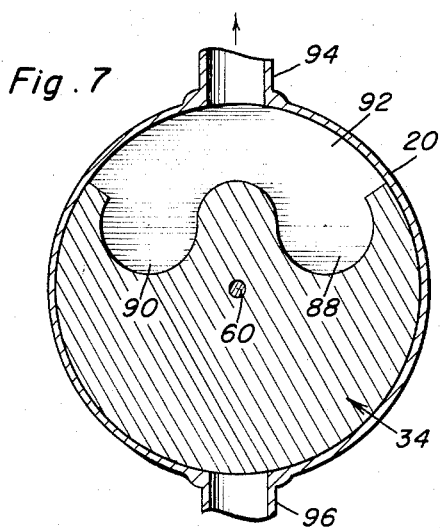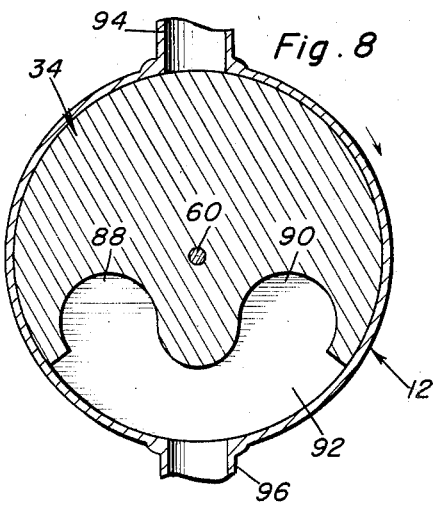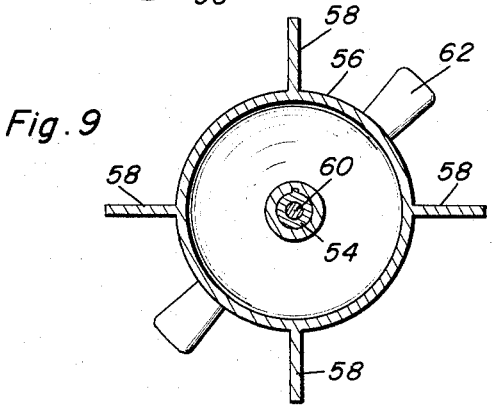
Ernest F. Boegel
INVENTOR.

United States Patent Office 2,860,661
Patented Nov. 18, 1958

2,860,661

CONTROLLABLE MIXING FAUCET

Ernest F. Boegel, Oakland, Calif.

Application March 28, 1956, Serial No. 574,406

4 Claims. (Cl. 137—637.3)

This invention relates in general to new and useful improvements in water faucets, and more specifically to an improved controllable mixing faucet.

The primary object of this invention is to provide a mixing faucet which when used in conjunction with a bathtub having a shower attachment may also be used for controlling the direction of flow of water either into the bathtub or in through the shower fitting.

Another object of this invention is to provide an improved mixing faucet which is of an extremely simple construction and formed of a relatively few component parts so as to be economical in manufacture and therefore economically feasible.

Still another object of this invention is to provide an improved controllable mixing faucet which is so constructed whereby it may be mounted in a wall above a bathtub and which includes a first valve member for controlling the flow of water into the mixing faucet body and a second valve member for mixing hot and cold water within the valve body so that water at the desired temperature may exit from the faucet, the second valve also controlling the direction of flow of water from the faucet.

A further object of this invention is to provide an improved mixing faucet intended to be mounted within a wall, the mixing faucet including a cup-like valve body having the outer end thereof closed by a removable cap, all of the components of the mixing faucet being disposed within the valve body and being removable therefrom upon the removal of the cap.

These together with other objects and advantages which will become subsequently apparent reside in the details of construction and operation as more fully hereinafter described and claimed, reference being had to the accompanying drawings forming a part hereof, wherein like numerals refer to like part throughout, and in which:

Figure 5 is a transverse vertical sectional view taken substantially upon the plane indicated by the section line 5—5 of Figure 1 and shows the arrangement of hot and cold water ports formed in a partition wall of the mixing faucet and the relationship of a mixing valve member with respect thereto;

Figure 6 is a sectional view similar to Figure 5 and shows the mixing valve member rotated to a position for increasing the flow of hot water and decreasing the flow of cold water;

Figure 7 is a transverse vertical sectional view taken substantially upon the plane indicated by section line 7—7 of Figure 1 and shows the mixing valve member in a position for supplying water of a desired temperature to an outlet fitting which is intended to be connected to a shower fitting for a bathtub;

Figure 1:
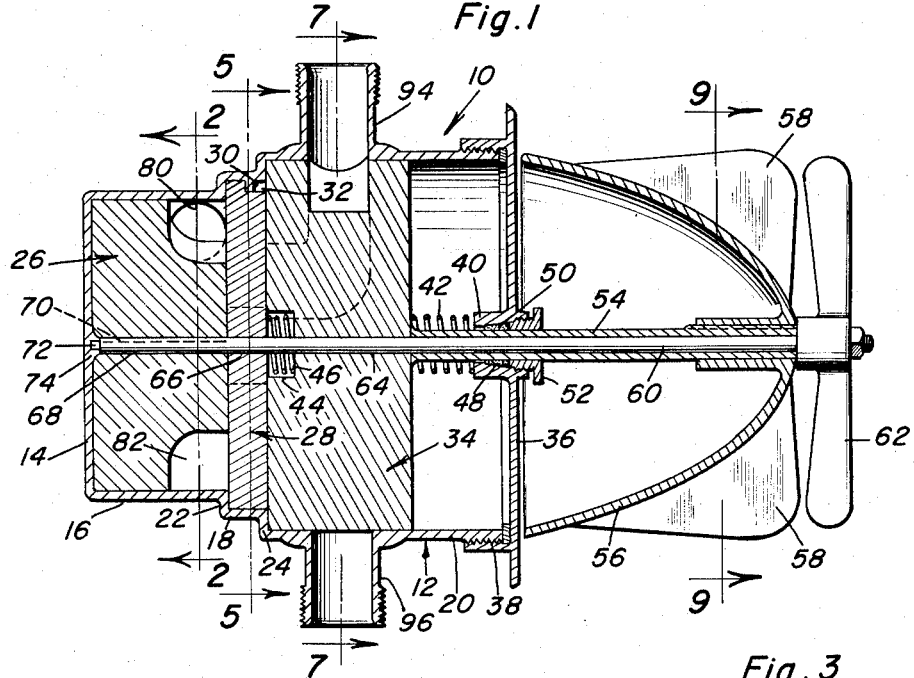
Figure 1 is a vertical sectional view taken through the center of the mixing faucet which is the subject of this invention and shows the general details thereof.

Figure 8 is a vertical sectional view similar to Figure 7 and shows the mixing valve member in a rotated member for supplying water to an outlet fitting which is adapted to be connected to a spout of a bathtub; and Figure 9 is a transverse vertical sectional view taken substantially upon the plane indicated by the section line 9—9 of Figure 1 and shows the means for controlling the valve members of the mixing faucet.

Referring now to the drawings in detail, it will be seen that there is illustrated in Figure 1 the mixing faucet which is the subject of this invention, the mixing faucet being referred to in general by the reference numeral 10. The mixing faucet 10 includes a valve body which is referred to in general by the reference numeral 12. The valve body 12 is of a generally cup shape configuration and lies on its side. The valve body 12 includes a rear wall 14, a rear reduced portion 16, an intermediate portion 18 and a forward portion 20, the forward portion 20 being of a larger diameter than the intermediate portion 18. Disposed between the intermediate portion 18 and the rear portion 16 is an annular shoulder 22. A similar annular shoulder 24 is disposed between the intermediate portion 18 and the outer portion 20.

Seated in the rear portion 16 is a flow control valve member which is referred to in general by the reference numeral 26. Disposed in the intermediate portion 18 is a partition wall 28 which is disposed in abutting relation with the shoulder 22 and is locked against rotation by a key 30 carried by the intermediate portion 18 and seated in a keyway 32 formed in the partition wall 28.

Disposed in the rear part of the forward portion 20 is a combined temperature control and mixing valve member which is referred to in general by the reference numeral 34. Closing the open forward end of the valve body 12 is a cap 36 which is removably connected to the forward portion 20 by suitable threads 38. The cap 36 has a central boss 40 against which there is seated a coil spring 42. The opposite end of the coil spring 42 is seated against the forward face of the mixing valve member 34 and holds it in engagement with the shoulder 24. The inner face or rear face of the mixing valve member 34 is provided with a recess 44 in which there is seated a spring 46. The spring 46 bears against the partition wall 28 and holds it in place against the shoulder 22.

The boss 40 of the closure cap 36 is provided with a bore 48 in which there is disposed packing 50. A packing nut 52 is threadedly engaged in a forward portion of the bore 48. Extending through the packing nut 52 and sealed with respect to the closure cap 36 by the packing 50 is a tubular valve stem 54. The inner end of the tubular valve stem 54 is secured to the forward face of the mixing valve member 34 for controlling the positioning thereof. Secured to the outer portion of the tubular valve stem 54 is a truncated housing member 56 which is provided with a plurality of fins 58 to facilitate the rotation of the valve stem 54.

Extending through the valve stem 54 and journaled therein is a valve stem 60. The valve stem 60 has the outer end thereof provided with a suitable handle 62. The valve stem 60 passes through a bore 64 in the mixing valve member 34 and through a similar bore 66 in the partition wall 28. The flow control valve member 26 is provided with a bore 68 into which the valve stem 60 extends, the valve stem 60 being secured to the flow control valve member 26 by a key 70. The rear end of the valve stem 60 is provided with a reduced portion 72 which is journaled in a bore 74 carried by the rear wall 14 and extending forwardly therefrom.

Figure 2:
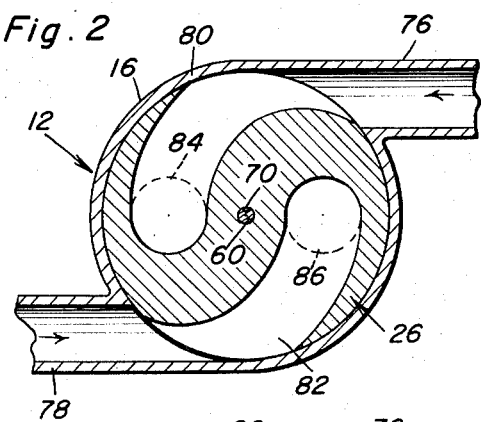
Figure 2 is a transverse vertical sectional view taken substantially upon the plane indicated by the section line 2—2 of Figure 1 and shows the arrangement of hot and cold water inlet fittings on the valve body and the relationship of the flow control valve member with respect thereto, the flow control valve member being in a full flow position.
Figure 3:
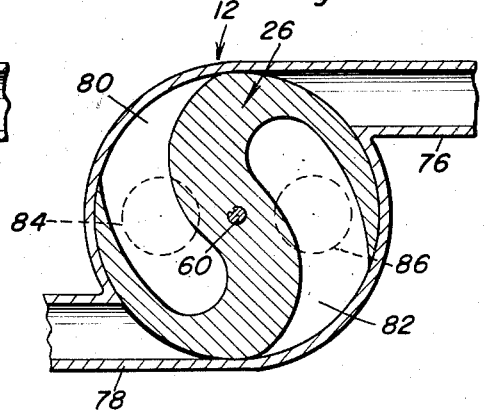
Figure 3 is a sectional view similar to Figure 2 and shows the flow control valve member rotated to a closed position.
Figure 4:
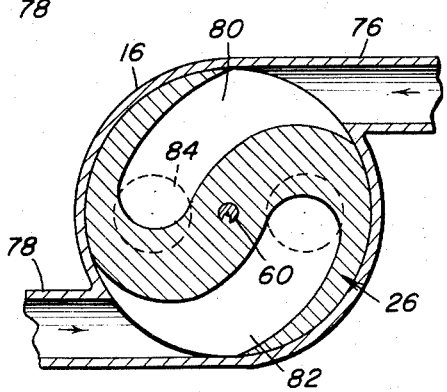
Figure 4 is a sectional view similar to Figure 2 showing the flow control valve member rotated to a partially opened position for controlling the volume of water passing into the valve body.

Referring now to Figures 2, 3, and 4, it will be seen that the rear portion 16 of the valve body 12 is provided with a cold water inlet fitting 76 and a hot water inlet fitting 78. The fittings 76 and 78 are communicated with the interior of the valve body 12 and are disposed in offset parallel relation.

Formed in the forward face of the flow control valve member 26 is a spiral cold water inlet passage 80. A similar spiral hot water inlet passage 82 is also formed in the forward face of the flow control valve member 26.

The partition wall, as is best illustrated in Figure 5, is provided with a cold water port 84 and a hot water port 86. The ports 84 and 86 are disposed in diametrically opposite relation with respect to the center of the partition wall 28 and the line through the centers of the ports 84 and 86 is disposed parallel to the fittings 76 and 78.

Referring once again to Figure 2 in particular, it will be seen that when the inlet passages 80 and 82 are fully aligned with their respective fittings 76 and 78, the innermost portions thereof are completely aligned with the ports 84 and 86. This is a position of maximum flow of water, both hot and cold, into the valve body 12. When it is desired to shut off the flow of water into the valve body 12, the flow control valve member 26 is rotated in a counterclockwise direction to the position best illustrated in Figure 3 where the passages 80 and 82 are no longer communicated with the fittings 76 and 78. On the other hand, when it is desired to reduce the flow of water through the valve body 12, the flow control valve member 26 is rotated in a clockwise direction so as to reduce the alignment of the ports 84 and 86 with the passages 80 and 82, respectively, as is best illustrated in Figure 4.

Referring now to Figures 7 and 8 in particular, it will be seen that the mixing valve member 34 has formed therein L-shaped hot and cold water passages 88 and 90 which open into a centrally located, peripheral passage 92 which is relatively wide.

As is best illustrated in Figure 5, the forward portion 20 is provided with an upwardly extending fitting 94 which is an outlet fitting to which there may be connected a shower fitting (not shown). Extending downwardly from the lower side of the forward portion 20 and communicating with the interior of the valve body 12 is an outlet fitting 96 which may be connected to the normal spout of a bathtub.

When the peripheral passage 92 is disposed in an uppermost position and aligned with the outlet fitting 94, the mixing faucet 10 is in a position for supplying water at the desired temperature to the shower fitting through the outlet fitting 94. As is best illustrated in Figure 5, the passages 88 and 90 are equally aligned with the ports 84 and 86. Thus an equal amount of hot and cold water will be distributed to the outlet fitting 94. When it is desired to increase the temperature of the water passing into the inlet fitting 94, the mixing valve member 20 is turned in a counterclockwise direction so that the overlapping of the passage 90 and the port 86 is increased and the overlapping of the passage 88 and the port 84 is decreased. This will result in an increase in the flow of hot water and a decrease in the flow of cold water into the outlet fitting 94 thus increasing the temperature of water passing therethrough.

When it is desired to supply water at the desired temperature to a bathtub or other outlet connected to the outlet fitting 96, it is necessary that the mixing valve member 34 be rotated 180° from the position illustrated in Figure 7 to the position illustrated in Figure 8 so that the peripheral passage 92 is aligned with the outlet fitting 96. When in this position, the relationship of the passages 88 and 90 with respect to the ports 84 and 86 will be similar to that illustrated in Figure 5, but reversed therefrom. However, by shifting the mixing valve member 34 in the desired direction, the desired overlap between the ports 84 and 86 and the passages 90 and 88, respectively, may be obtained so that water of the desired temperature may pass out through the outlet fitting 96.

It is pointed out at this time that the invention has been illustrated and described without any seals whatsoever with the exception of the packing 50. It is to be understood that all types of seals may be employed in the present invention as found necessary. However, for the purposes of illustrating and describing the invention it has not been found deemed advisable to show the seals inasmuch as they add nothing to the invention from the standpoint of its operation.

From the foregoing description of the invention, it will be readily apparent that there has been devised a simple mixing faucet which may be mounted in a wall above a bathtub and with a single set of controls may control the quantity of water, the temperature of the water and the direction of flow of water either to a shower fitting or directly into the bathtub. Thus the connecting of a shower fitting in a bathtub spout with a source of controlling the temperature of water is greatly simplified.

It is pointed out that the mixing faucet 10 is intended to be mounted in a horizontal position, as illustrated in Figure 1, with the major portion thereof disposed within a wall. When it is desired to repair the mixing faucet or to clean any of the parts thereof, it is merely necessary to remove the handle 62, the housing 56 and the closure cap 36. After this has been done, all of the components of the mixing faucet 10 may then be removed from the valve body 12. Such an arrangement makes the present invention feasible from a use standpoint. Further, such an arrangement makes the invention feasible from an economical manufacturing standpoint inasmuch as it may be easily assembled and the device is readily suitable to mass production.

If it is so desired, suitable fasteners may be used to retain the partition wall 28 in place in the valve body 12. The fastener could be threaded into the shoulder 22. Also, a retaining pin could be carried by the valve stem 60 for engagement behind the partition wall 28 to prevent the accidental removal of the valve stem 60.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A mixing faucet comprising a hollow body, hot and cold water inlet fittings on said hollow body and communicated with the interior thereof, a volume control valve member mounted in said hollow body for rotation, hot and cold water ports in said hollow body, said volume control valve member being disposed within said hollow body intermediate said hot and cold water inlet fittings and said hot and cold water ports and controlling the volume flow of water between said hot and cold water inlet fittings and said hot and cold water ports, respectively, a pair of diametrically opposed outlet fittings on said hollow body, a combined water temperature control and mixing valve member disposed within said hollow body between said hot and cold water ports and said outlet fittings and controlling the proportional flow of hot and cold water through said hot and cold water ports to control the temperature of water discharged from said faucet, said mixing valve member having an outlet port selectively aligned with said outlet fittings to control the direction of flow of water out of said hollow body, and control means for said volume control valve member and said combined water temperature control and mixing valve member.

2. A mixing faucet comprising a hollow body, hot and cold water inlet fittings on said hollow body and communicated with the interior thereof, a volume control valve member mounted in said hollow body for rotation, hot and cold water ports in said hollow body, said volume control valve member being disposed within said hollow body intermediate said hot and cold water inlet fittings and said hot and cold water ports and controlling the volume flow of water between said hot and cold water inlet fittings and said hot and cold water ports, respectively, a pair of diametrically opposed outlet fittings on said hollow body, a combined water temperature control and mixing valve member disposed within said hollow body between said hot and cold water ports and said outlet fittings and controlling the proportional flow of hot and cold water through said hot and cold water ports to control the temperature of water discharged from said faucet, said mixing valve member having an outlet port selectively aligned with said outlet fittings to control the direction of flow of water out of said hollow body, and control means for said volume control valve member and said combined water temperature control and mixing valve member, said hot and cold water ports being in alignment transversely of a line between said outlet fittings.

3. A mixing faucet comprising a hollow body, hot and cold water inlet fittings on said hollow body and communicated with the interior thereof, a volume control valve member mounted in said hollow body for rotation, hot and cold water ports in said hollow body, said volume control valve member being disposed within said hollow body intermediate said hot and cold water inlet fittings and said hot and cold water ports and controlling the volume flow of water between said hot and cold water inlet fittings and said hot and cold water ports, respectively, a pair of diametrically opposed outlet fittings on said hollow body, a combined water temperature control and mixing valve member disposed within said hollow body between said hot and cold water ports and said outlet fittings and controlling the proportional flow of hot and cold water through said hot and cold water ports to control the temperature of water discharged from said faucet, said mixing valve member having an outlet port selectively aligned with said outlet fittings to control the direction of flow of water out of said hollow body, and control means for said volume control valve member and said combined water temperature control and mixing valve member, a partition member disposed within said hollow body between said volume control valve member and said combined water temperature control and mixing valve member, said hot and cold water ports being formed in said partition member.

4. A mixing faucet comprising a hollow body, hot and cold water inlet fittings on said hollow body and communicated with the interior thereof, a volume control valve member mounted in said hollow body for rotation, hot and cold water ports in said hollow body, said volume control valve member being disposed within said hollow body intermediate said hot and cold water inlet fittings and said hot and cold water ports and controlling the volume flow of water between said hot and cold water inlet fittings and said hot and cold water ports, respectively, a pair of diametrically opposed outlet fittings on said hollow body, a combined water temperature control and mixing valve member disposed within said hollow body between said hot and cold water ports and said outlet fittings and controlling the proportional flow of hot and cold water through said hot and cold water ports to control the temperature of water discharged from said faucet, said mixing valve member having an outlet port selectively aligned with said outlet fittings to control the direction of flow of water out of said hollow body, and control means for said volume control valve member and said combined water temperature control and mixing valve member, a partition member disposed within said hollow body between said volume control valve member and said combined water temperature control and mixing valve member, said hot and cold water ports being formed in said partition member, a cap on said hollow body, said cap retaining said combined water temperature control and mixing valve member, said partition member and said volume control valve member in said hollow body.

References Cited in the file of this patent

UNITED STATES PATENTS 2,662,722    Gragiano _____ Dec. 15, 1953

FOREIGN PATENTS 111,093    Switzerland _____ of 1925